Patented Jan. 20, 1953

2,626,275

UNITED STATES PATENT OFFICE 2,626,275

PROCESS FOR CATALYTIC CONVERSION OF CARBON MONOXIDE AND HYDROGEN TO HYDROCARBONS, OXYGENATED HYDROCARBONS, AND THE LIKE

Frederick W. Sullivan, Jr., Madison, N. J., assignor to Hydrocarbon Research, Inc., New York, N. Y., a corporation of New Jersey No Drawing. Application February 18, 1947,
Serial No. 729,411

5 Claims. (Cl. 260—449.6)

This invention relates to the operation of exothermic catalytic conversions and more particularly, in its preferred aspect, is concerned with the catalytic reduction of carbon monoxide by hydrogen.

The practical application of many catalytic gaseous reactions involving the liberation of heat has been seriously limited by the necessity for eliminating heat from the system at such rate and under such conditions as to assure continuous maintenance of optimum, uniform temperatures throughout the reaction zone. This is particularly true in the case of processes involving the reduction of carbon monoxide and the like by passage of the gaseous reactants through a fixed bed of contact mass. The so-called fluidized system of operation has afforded, in many instances, an important solution to this problem. In this type of operation the catalyst, in powdered form, is maintained in a state of fluidization by suspending it in a flow of the reactant gases such that each particle is at all times substantially surrounded by gases. It has been found that this expedient effects a surprising uniformity of temperature throughout the resultant turbulent mass of particles, with a rapid rate of heat flow, characteristic of fluid heat transfer, to adjacent cooling surfaces.

Where, however, highly active catalytic materials are employed, it is possible to carry out the required catalytic conversion in a relatively small mass of catalytic material relative to the overall rate of fresh feed input such that the rate of exothermic heat liberation is materially beyond the power of the cooling surfaces to permit adequate removal. In such cases, space velocities of reactant feed could be materially increased while still securing the required degree of conversion were it not for the fact that the maximum amount of cooling surface which can be practically contacted with catalyst is insufficient to maintain the temperature within the optimum limit required by the reaction. The maximum practical amount of cooling surface which can be disposed in the mass must depend upon the requirement that the contact mass be maintained throughout in a state of uniform, proper fluidization and that the catalyst spaces provide passages of proper size and disposition.

Where a substantial excess of catalyst is employed over and above that required, it has been observed that the inherent advantages of the fluidized system are impaired in such a manner as to suggest extremely localized and probably momentary temperature variations from optimum at catalyst surfaces. Moreover, in many cases, as for example in operations where it is desirable to carry out the reaction in stages, with only partial conversion of the total reactant feed in each stage, it would be apparent that an excess of catalyst can not properly be employed. Even where substantially complete reaction is desired, an excess of catalyst or, in other words, a prolonged contact time is frequently detrimental since some of the reaction products are undesirably altered by contact with the catalyst; under these same circumstances, the catalyst tends to carbonize or otherwise become fouled with a deposit of high molecular weight reaction products.

It has been proposed for entirely different purposes, to prepare the catalyst in conjunction with a suitable diluent support, but due to the more or less uniform distribution of, and impregnation by the catalytic material, the surface of the entire mass partakes of generally uniform catalytic characteristics. Thus, operation of a fluidized system with a catalyst disposed upon an inert support involves many of the disadvantages of a catalyst containing no such diluent support. It is well known that the support of a catalyst affects the catalyst properties. Moreover, such proposals generally aim at materially decreasing the activity of the active catalyst surfaces with its attendant disadvantageous effect upon the process. In the fixed bed operation on the other hand, conventional catalyst supports are rather generally good heat insulators which actually operate to promote localized overheating and with accompanying uncontrolled temperature variations.

In accordance with the present invention it has been found that the foregoing difficulties can be overcome by operation in the presence of heat transfer surfaces and a fluidized mass composed not only of catalytically active particles but of discrete particles of an inert solid material maintained in uniform admixture therewith preferably by the normal turbulence of the fluidizing action. More particularly the volume of the reaction zone may be materially enlarged by diluting the catalyst with some inert powdered material capable of remaining in substantially uniform admixture therewith during the passage of the reactant gases. Surprisingly the inert particles do not impair heat transmission to the cooling surfaces and in fact promote dissipation of the exothermic heat of reaction as well as uniformity of temperature within the fluidized mass as though the catalyst were immersed in a boiling heat transfer liquid. It appears moreover that the presence of relatively inert particles adjacent each catalytic particle counteracts any tendency for localized and momentary temperature variations referred to above, so that truly uniform temperatures prevail locally throughout the mass. This is indicated by the higher permissible operating temperatures referred to hereinafter, and is probably dependent upon a new surface heat transfer phenomenon inherent in fluidization and involving highly efficient radiation between closely disposed surfaces.

The catalyst powder for carrying out the catalytic reduction of carbon monoxide may comprise any of the known and effective metals of the iron group as for example iron, cobalt or nickel together with suitable promoters. Advantageously the catalyst powder may consist of an iron powder containing about 1 to 2% of potassium oxide and about 2 to 3% alumina. Other promoters may be, for example, the oxides of thorium, magnesium, uranium, and vanadium, etc., if desired. The catalyst may be supported on a material such as diatomaceous earth, silica gel or Filtrol, by methods involving impregnation and reduction of suitable mixtures, as is well known.

To permit proper fluidization the catalyst powder may consist of particles finer than 100 mesh, preferably finer than 200 mesh. On the other hand fluidization, particularly in the dense phase, may be satisfactorily carried out with relatively coarser particles as large as 40 mesh for instance where other conditions permit.

The discrete particles of inert, solid material admixed with catalyst should be so selected as to possess equivalent fluidizing properties to those which characterize the particles of the particular catalyst selected for admixture therewith.

In short the catalyst and inert diluent maintain their most uniform degree of admixture, in widely varying types of fluidized reaction systems met with in practice, where their respective particle size, density and shape are such as to promote similar fluidizing characteristics. Although the inherent turbulence of the fluidization process will frequently permit quite substantial variation in particle size and density without impairing operation or causing classification, it is advisable to seek mixtures wherein these characteristics, as referred to the catalyst and diluent particles, are equivalent. Where there is a wide variation in densities, an inverse adjustment in respect to particle size may serve to maintain uniform equivalent fluidizing properties, but in any event proper characteristics of the admixture can be best determined by selection of test samples which will function in the particular reactor without classification, the catalyst and diluent remaining in uniform admixture throughout the reaction zone.

By the term "discrete particles of inert diluent materials" and similar expressions, I mean particles separate and distinct from those of the catalyst, which have no material or substantial catalytic effect in the process. It is true, of course, that widely varying materials otherwise classed as inert, may possess some minute or insignificant catalytic activity with respect to some aspects of the complex operations going on in the reaction zone. The foregoing term, however, refers to materials having no, or such low catalytic effect with respect to the exothermic reaction to be carried out as to be of no commercial significance as a catalyst.

The discrete particles of inert diluent material may be selected from a wide range of substances including powdered sand, silica, glass and other vitreous materials. Graphite and coke likewise form important diluents which seem to possess thermal properties which are ideal in respect to the control of exothermic heat in the fluidized system. Of the common metals, aluminum powder is suitable, and copper, while indicated to have some catalytic effect in intimate chemical association with other catalytic materials, nevertheless is substantially inert when used as discrete particles in the present system. A completely spent metallic catalyst for the present process, as for example, any of the conventional iron or cobalt catalysts having no further appreciable catalytic activity, as well as powdered cast iron, which due to such factors as its normally high phosphorus content is inactive, likewise provide suitable alternatives.

In practicing the present invention it is normally desirable to provide no greater proportion of the inert particles than are necessary to accomplish the attainment of the optimum space velocity of operation for the specific catalyst. Determination of the precise proportion is difficult in advance due to the widely varying character of the numerous catalysts, and the resulting variation in the optimum conditions of operation. In general, however, for highly active catalysts the proportion of diluent inert particles will range between one to five times the quantity of the catalytic particles in the reaction zone. More frequently the optimum proportion may fall within range of one to two parts of inert particles, for each part of catalyst. Broadly, however, this proportion may be expected to fall as low as 0.1 or as high as 10 parts per part of catalyst. The foregoing proportions are herein expressed on the basis of settled volumes of the materials in question.

One practically advantageous method of arriving at the proper proportion of discrete diluent involves in effect the experimental addition thereof to the catalyst in the reactor until the optimum space velocity is reached. Briefly, starting with a well designed reactor containing the fluidized mass of highly active catalyst in contact with cooling surfaces, the space velocity is increased with accompanying approach to optimum throughput and conversion. With such highly active catalysts, the condition will be reached where maintenance of the reaction zone within the necessary maximum upper limit of temperature for that catalyst, is impossible. Thereupon, the inert diluent material in discrete powdered form is added to the mass, and additions are made until optimum conditions of throughput and product recovery are obtained. This procedure serves to determine the proper proportion between the inert particles and catalyst particles for any specific catalyst.

By way of illustrating the operation of the present process in accordance with one specific embodiment thereof, I provide a fluidized reactor designed for dense phase fluidization operation without substantial entrainment of catalyst in the effluent gases. The reactor has vertical cooling tubes projecting into the bed of fluidized catalyst.

The catalyst comprises powdered iron of 200 mesh particle size and finer, at least 60% of which passes through a 325 mesh screen. Synthesis gas is supplied to the lower portion of the catalyst bed and passes through the catalyst under such conditions as to maintain a state of dense phase fluidization whereby the particles are retained in the reaction zone by hindered settling. Pressure within the system is maintained at 250 pounds per square inch gauge. The synthesis gas passes through the catalyst bed with a space velocity of 3500 v./hr./v. The average temperature within the catalyst mass can in this manner be kept within not more than 5° F. of the predetermined optimum temperature of 650° F. for this catalyst under the conditions described. That is to say, local temperatures, within the limitations of ordinary measurement, will not vary any further from optimum. Any further increase in space velocity would, however, result in undesired rise in local temperature in spite of maintenance of the cooling surfaces at a temperature of 625° F., and abnormal variations and gradients would prevail.

When, however, the foregoing iron catalyst is diluted in the ratio of one part thereof by settled volume to four parts by settled volume of finely powdered copper of substantially the same fluidizing characteristics as the iron and the powdered mixture is disposed in the same reactor as a fluidized bed of the same depth used in the preceding example, the space velocity of the synthesis gas may be increased to 12 000 v./hr./v. The operation is conducted under the same pressure and temperature conditions as before.

A comparison of the two foregoing operations follows:

| | Undiluted Catalyst | Diluted Catalyst |
|---|---|---|
| Gas linear velocity through catalyst bed ft./sec.. | 1.1 | 1.0 |
| Fluidized density of catalyst bed lbs./cu. ft.. | 70 | 104 |
| Carbon monoxide converted to: | | |
| 1. Carbon dioxide percent.. | 27 | 17 |
| 2. $C_1$ and $C_2$ hydrocarbons do.... | 28 | 21 |
| 3. $C_3$ and higher hydrocarbons do.... | 45 | 62 |
| Recovered normally liquid hydrocarbon based on 1 cubic meter (standard conditions) of synthesis gas fed to reactor gms./cu. m.. | 95 | 130 |

It is well to note that with a substantial proportion of inert discrete particles in the catalyst mass, it is possible to operate the reaction zone at a temperature somewhat increased over that hitherto deemed to be optimum. Thus, the second operation described above may have a temperature of 675° F. within the reaction zone without sacrificing any of the foregoing advantages. In fact, desorption of the products of reaction from the solid particles within the reaction zone appears to be increased, and there is a material shift in the molecular weight of the reaction products produced toward hydrocarbons coming within the gasoline boiling range. In some instances it may be possible to raise the reaction temperature as much as 100° F. above that previously determined as optimum for the catalyst in question.

As indicated above, this improved result is conceived to result from the function of the inert particles in eliminating or suppressing all tendency to highly localized temperature variations at points on the catalyst surface.

The reaction, referred to in the foregoing examples, may be conducted in any of the conventional reaction vessels so formed as to permit gas flow upwardly throughout all portions of the mass of powdered catalyst contained in a reaction zone, and provided with cooling surfaces. To this end the cooling surfaces normally take the form of a cooling jacket disposed about the reaction zone or a tubular form of heat exchanger extending into the catalyst mass, and being so designed as to permit even flow of gases thereabout as well as uniform fluidization of the catalyst particles without creation of so-called "dead spots" or slugging of the particles. One ideal type of internal cooling element is the so-called bayonet type of cooling tube supported from above, sealed at its lower end and supplied internally with liquid coolant by an internal tube extending almost to the bottom of the outer tube. Such elements are normally fed with a coolant such as water, mercury or Dowtherm from a header disposed above the reaction zone and the outlet fluid, whether in liquid or vaporous form is handled in the same manner. The temperature of the cooling surfaces may be closely controlled by rate of coolant flow or by maintenance of a specific pressure corresponding to the boiling point of the liquid coolant at the desired cooling surface temperature, all as known in the art.

As is known, the composition of synthesis gas may vary widely in ratio of hydrogen to carbon monoxide. Tail gases from the reaction effluent may be recycled to the reactor, if desired. Moreover, the process is applicable to processes operating under conditions wherein carbon dioxide as well as carbon monoxide is reduced with the formation of higher molecular weight hydrocarbons. Likewise the invention is applicable to the production of oxygenated hydrocarbons under the known conditions of temperature applicable thereto. In fact varying small proportions of oxygenated hydrocarbons are normally produced when operating for the manufacture of hydrocarbons boiling in the gasoline range.

The foregoing references to space velocities are based on the volume (standard conditions) of synthesis gas fed per hour per settled volume of powdered catalyst contained in the reaction zone, neglecting the volume of the inert diluent material which may be admixed therewith.

While mention has been made of specific temperature conditions, it is understood that the reaction temperature may vary widely depending on the catalyst employed and the type of synthesis product desired. Generally, the temperature range for iron catalysts is 500° to 750° F., preferably about 600° to 675° F. Cobalt type catalysts, as is known, normally function most satisfactorily at temperatures lower than those for iron catalysts.

The invention is also applicable to other types of exothermic reactions wherein reactants in gasiform phase are converted exothermically in the presence of a solid catalyst.

Obviously many modifications and variations of the invention as above set forth may be made without departing from the spirit and scope thereof, and therefore, only such limitations should be imposed as are indicated in the appended claims.

I claim:

1. In the catalytic conversion of carbon monoxide and hydrogen to hydrocarbons, oxygenated hydrocarbons and the like, of desired characteristics, through the agency of a powdered synthesis catalyst capable of dense phase fluidization, disposed in a reaction zone in heat exchange relationship with cooling surfaces disposed within the reaction zone and maintained at a predetermined temperature by a flow of coolant in contact therewith and in indirect heat exchange relationship with the catalyst, the heat of reaction being removed substantially entirely by said surfaces and said catalyst possessing such high activity that the maximum unit charging rate of reactants per unit of catalyst maintained as a fluidized dense phase, consisting solely of said powdered catalyst, is limited by the area of cooling surfaces available within the reaction zone, the improvement which comprises providing in substantially uniform admixture with said powdered catalyst discrete particles of catalytically inert material having substantially the same fluidizing characteristics as the catalyst particles in a proportion effective to materially increase the volume of said fluidized dense phase so that the area of cooling surfaces contacted by said fluidized dense phase is materially increased, and the maximum unit charging rate of reactants per unit of catalyst is also materially increased without substantially impairing the extent of conversion of reactants to the desired products.

2. The improvement according to claim 1, wherein the proportion of discrete solid particles of non-catalytic material to the catalyst is in the range of about 0.1 to about 10 on the basis of the settled volumes of catalyst and non-catalytic material.

3. The improvement according to claim 1, wherein the proportion of discrete solid particles of non-catalytic material to the catalyst is in the range of about 1 to about 5 on the basis of the settled volumes of catalyst and non-catalytic material.

4. The improvement according to claim 1, wherein an iron-type catalyst is employed in a reaction zone maintained at a temperature in the range of about 500 to 750° F.

5. The improvement according to claim 1, wherein an iron catalyst containing small amounts of potassium oxide and aluminum oxide is employed at a temperature of about 600 to 675° F.

FREDERICK W. SULLIVAN, JR.

REFERENCES CITED

The following references are of record in the file of this patent:

UNITED STATES PATENTS

| Number | Name | Date |
|---|---|---|
| 2,393,909 | Johnson | Jan. 29, 1946 |
| 2,396,109 | Martin | Mar. 5, 1946 |
| 2,417,164 | Huber | Mar. 11, 1947 |
| 2,459,444 | Main | Jan. 18, 1949 |
| 2,464,616 | Schwarzenbek et al. | Mar. 15, 1949 |
| 2,468,521 | Sweetser et al. | Apr. 26, 1949 |